United States Patent [19]

Taniguchi et al.

[11] Patent Number: 5,202,364

[45] Date of Patent: Apr. 13, 1993

[54] AQUEOUS DISPERSION COATING MATERIAL CONTAINING EPOXY DENATURED ALKYD

[75] Inventors: Hitoshi Taniguchi, Kamakura; Masahiro Ishidoya, Yokohama; Ken Nakashima, Nishinomiya; Hisao Ogawa, Zushi, all of Japan

[73] Assignee: Nippon Oil and Fats Co., Ltd., Tokyo, Japan

[21] Appl. No.: 719,668

[22] Filed: Jun. 24, 1991

Related U.S. Application Data

[63] Continuation of Ser. No. 206,477, Jun. 13, 1988, abandoned.

[51] Int. Cl.$^5$ .............................................. C08K 3/20
[52] U.S. Cl. .................................... 523/403; 523/404; 525/438; 525/524; 525/533
[58] Field of Search ............................... 523/403, 404

[56] References Cited

U.S. PATENT DOCUMENTS

| | | | |
|---|---|---|---|
| 4,179,440 | 12/1979 | Martinez | 523/404 |
| 4,304,804 | 12/1981 | Fitko | 523/100 |
| 4,442,246 | 4/1984 | Brown | 523/404 |
| 4,480,058 | 10/1984 | Ting | 523/404 |
| 4,511,682 | 4/1985 | Mayer | 524/539 |
| 4,528,318 | 7/1985 | Konishi | 525/444 |

FOREIGN PATENT DOCUMENTS 61-268764  5/1986  Japan .
62-127359  7/1987  Japan .

OTHER PUBLICATIONS

Defunctionalizing Technique for Producing Epoxy Resin-Phthalic Alkyds, Industrial and Engineering Chemistry, pp. 1080–1085.
English Language Translation of Abstract of Technical Information of Soken Chemical & Engineering Co., Ltd.

Primary Examiner—John C. Bleutge
Assistant Examiner—Frederick Krass
Attorney, Agent, or Firm—Flynn, Thiel, Boutell & Tanis

[57] ABSTRACT

An aqueous dispersion coating material containing, as a film-forming constituent, an aqueous dispersion that can be obtained by contacting with an aqueous medium, a base-neutralized resin reaction product with an acid value of 10 to 30 which can be obtained by reacting a water-soluble epoxy-denatured alkyd resin with an epoxy resin in solid state at ordinary temperature and by adding and polymerizing at least a part of these resins and then neutralizing the resin reaction product with a base.

Because this coating material has been emulsified in a translucent colloidal emulsion region with an aqueous medium, its finished appearance and corrosion resistance are superior and its structural viscosity can be controlled without damaging the storage stability through the addition of organic solvents, and the excellent finished appearance can also be obtained by atomization coating in addition to immersion coating, flow coating and the like, of vertical areas, and this coating material has applicability to a variety of coating methods.

10 Claims, No Drawings

AQUEOUS DISPERSION COATING MATERIAL CONTAINING EPOXY DENATURED ALKYD

This is a continuation of U.S. Ser. No. 7/206 477, filed Jun. 13, 1988, now abandoned.

This application is related to U.S. Ser. No. 7/206 478, filed Jun. 13, 1988, now abandoned.

BACKGROUND OF THE INVENTION

1. Field of the Invention

The present invention relates to an aqueous dispersion coating material, and more particularly, relates to an aqueous dispersion coating material having an excellent corrosion resistance, storage stability and finished appearance and, furthermore, provides a coating adequate for a wide variety of coating applications.

2. Description of the Prior Art

In recent years, even in general industrial coating fields not employing an electro-deposition coating system because of environmental preservation and resource saving, it has become necessary to develop an aqueous coating material which is capable of providing a coated film having excellent corrosion resistance without using such harmful heavy metal system corrosion resistant pigments as chrome, lead and the like. Especially desired is the enhancement of the corrosion resistance of a coated film to be formed on so-called untreated iron surfaces which have not been chemically treated such as zinc phosphate or iron phosphate coated irons.

To cope with this kind of demand, a study has conventionally been made for achieving this improvement by improving the performance of the resin itself without relying upon corrosion resistant pigments, and the development of aqueous coating materials containing such resins having excellent corrosion resistance, such as maleinized polybutadiene resin, phenol-denatured water-soluble resins and epoxy-denatured resins which have been esterificated by ring-opening.

These types of aqueous coating materials are superior to aqueous coating materials containing simple polyester resins and acrylic system resins which are not denatured, but cannot satisfy the demands of a high level of corrosion resistance performance needed recently.

Japanese Patent Application Laid-Open No. 127359/1987 discloses that excellent corrosion resistance is provided by an aqueous dispersion coating material mainly consisting of an aqueous dispersion which can be obtained by compounding a special aqueous epoxy resin, mainly consisting of a bisphenol epoxy resin residue, with a solid epoxy resin having excellent corrosion resistance at normal temperatures.

The aqueous dispersion coating material proposed in the aforementioned patent application is higher in structural viscosity than conventional water-soluble coating materials, and for this reason, possesses the benefit that a thick film coating is available at the time of atomization coating by using an air spray or an airless spray on flat areas. However, the addition of this coating material to an organic solvent to control the structural viscosity of the aqueous coating materials, not only will bring about the aggregation of the dispersed particles but also deteriorates the storage stability of the coating material and, therefore, the structural viscosity cannot be controlled through the addition of organic solvents. If the coating material is applied without controlling the structural viscosity, liquid puddles and pinholes are caused to appear and degrade the appearance when using immersion coating or flow coating against vertical areas, which are widely used types of industrial coatings, and, therefore, there were problems such as the coating workability getting worse and the application of these types of coatings being difficult.

SUMMARY OF THE INVENTION

An object of the present invention is to provide an aqueous dispersion coating material for solving the aforementioned problems which have a superb corrosion resistance, storage stability and finished appearance, is able to have its structural viscosity controlled through the addition of organic solvents, can obtain an excellent finished appearance, even by immersion coating, flow coating, etc. on vertical faces with a favorable coating workability, and can be applied to a wide range of coating fields.

An aqueous dispersion coating material of the present invention comprises, as a film-forming constituent, an aqueous dispersion which is obtained by emulsifying a resin reaction product in an aqueous medium in the presence of a base, said resin reaction product having an acid value of 10 to 30 and being obtained by addition polymerization of the following resins "A" and "B" at a ratio of from 80/20 to 20/80 by weight.

Resin "A": A water-soluble epoxy-denatured alkyd resin with an acid value of 20 to 50, a hydroxyl value of 100 to 300 and a number average molecular weight of 1,000 to 10,000 containing 30 to 60 weight % of a bisphenol epoxy resin in the main chain and 10 to 35 weight % of an alkyl group with 8 to 30 carbon atoms in the side chain.

Resin "B": An epoxy resin with a molecular weight of 2,000 to 30,000 and an epoxy equivalent of 1,500 or more, and being solid at normal temperatures.

DETAILED DESCRIPTION OF THE INVENTION

In this invention, because the reaction product of resin "A" and resin "B", in which a part of oxirane ring or hydroxyl group of resin "B" is added and polymerized by esterification to a part of carboxyl group of resin "A", has hydrophilic properties, the reaction product itself not only disperses into an aqueous medium, it also disperses the non-reacted resin "B" inside the resin reaction product into the aqueous medium in translucent colloidal emulsion region because of its surfactant action. The aqueous dispersion is extremely stable, in comparison with conventional resin dispersions, against the addition of organic solvents. An aqueous dispersion coating material containing as a film-forming constituent a translucent aqueous dispersion obtained by the aforesaid reaction product has excellent corrosion resistance equal to an aqueous dispersion coating material containing, as a film forming constituent, a resin dispersion obtain when resins "A" and "B" have not been condensed at all, and, on the other hand, the structural viscosity of the coating material can be controlled by the addition of organic solvents. Therefore, an excellent finished appearance can be obtained by immersion coating and flow coating on vertical areas, and, moreover, its storage stability is favorable, even after organic solvents have been added to it. The resin "A" in the present invention is a water-soluble epoxy-denatured alkyd resin with an acid value of 20 to 50, preferably 25 to 40, a hydroxyl value of 100 to 300, preferably 100 to 200 and a number average molecular weight of 1,000 to 10,000, preferably 1,000 to 5,000 and contains 30 to 60 weight %, preferably 30 to 50 weight % of a bisphenol epoxy resin, in the main chain and, moreover, has 10 to 35 weight %, preferably 10 to 30 weight % of alkyl groups having 8 to 30 carbon atoms, preferably 10 to 20 carbon atoms, in the side chain and has a perfect compatibility with resin "B", which is high molecular weight epoxy resin. This resin "A" is converted into an added/polymerized substance having hydrophilic properties by adding and polymerizing at least a part of the water-insoluble resin "B" through esterification, which disperses the resin "B" into an aqueous medium in a colloidal emulsion region and forms a highly corrosion-resistant film.

As resin "A", a water-soluble epoxy-denatured alkyd resin can be used that can be synthesized by a publicly known method using a commercially available bisphenol epoxy resin and usual polyester-forming materials.

As a bisphenol epoxy resin constituent, a liquid state epoxy resin with a low molecular weight is preferable because denaturation can be controlled easily, and, as examples, such substances as "EPIKOTE 828", "EPIKOTE 834" (trademarks of Shell Chemical Corp.), "EPICLON 840", "EPLICON 850" (trademarks of Dainippon Ink Chemicals Co., Ltd., "ARALDITE GY250", "ARALDITE GY260" (trademarks of Ciba-Geigy Co., Ltd.) and the like can be enumerated.

As the aforementioned polyester forming materials, there are materials of a polyol constituent, a polyacid constituent, and an alkyl group constituent having from 8 to 30 carbon atoms to be combined to the side chain. As the polyol constituent, such substances as ethylene glycol, propylene glycol, diethylene glycol, butylene glycol, neopentyl glycol, 1-5-pentanediol, hexanediol, 2,2-dimethylpentane-1,3-diol, hydrogenated bisphenol A, hexylene glycol, glycerol, trimethyrol ethane, trimethyrol propane, 1,2,6-hexanetriol, trimethyrol cyclohexane, pentaerythritol, sorbitol, diglycerol, dipentaerythritol, etc., can be used.

Further, as the polyacid constituent, for example, such substances as phthalic anhydride, isophthalic acid, terephthalic acid, tetrahydrophthalic anhydride, hexahydrophthalic anhydride, maleic anhydride, fumaric acid, succinic acid, glutaric acid, adipic acid, trimethyl adipic acid, sebacic acid, dodecandicarbonic acid, dimethyrol propionic acid, trimellitic anhydride, pyromellitic anhydride, butane tetracarboxylic acid, etc., can be used.

As the alkyl group-providing materials having 8 to 30 carbon atoms to be combined in the side chain, such substances as fatty acids, monohydric alcohols, fatty esters, aliphatic epoxy compounds, etc., can be used. As fatty acids, such substances as natural fatty acids that can be obtained from soy beans oil, coconut oil, safflower oil, cotton seed oil, rice oil, castor oil, castor oil anhydride, hydrogenated castor oil, tung oil, linseed oil, tall oil and the like can be used as well as a variety of synthesized fatty acids with 8 through 30 carbon atoms. Further, as monovalent alcohols, such substances as lauryl alcohol, myristyl alcohol, cetyl alcohol, stearyl alcohol and oleyl alcohol that can be obtained by reduction of the aforementioned natural fatty acids, and synthetic alcohols with 8 through 20 carbon atoms, as well as alkyl-substituted hydrogenated phenols with 2 through 24 carbon atoms.

As the fatty esters, such substances as glycidyl esters of fatty acids with 5 through 25 carbon atoms can be used, and as aliphatic epoxy compounds, such substances as aliphatic epoxy compounds obtained by the oxidation of an α-olefin with 8 to 30 carbon atoms can be used.

Why resin "A" is limited to the aforesaid range in the present invention is attributed to the following reason. When the bisphenol epoxy resin contained in the main chain of resin "A" is less than 30 weight %, its compatibility with resin "B" decreases, and for this reason, not only can a translucent resin dispersion in the colloidal emulsion region not be obtained but the corrosion resistance of the coated film may also deteriorate. Moreover, if the bisphenol epoxy resin content exceeds 60 weight %, the flexibility of the coated film will be lost.

If the carbon number of the alkyl group in the side chain of resin "A" is less than 8 or the content of the alkyl group is less than 10 weight %, it is difficult to obtain a stable and uniform resin dispersion because of insufficient emulsification force at the time of emulsification, and if this substance is used as a coating material, its surface tension will be too high and for this reason, coated film defects as insufficient wetting and pinholes are likely to happen. If the carbon number of the alkyl group exceeds 30 or the content of alkyl group exceeds 35 weight %, its compatibility with resin "B" is lost and emulsification becomes difficult, which is not favorable.

When the acid value of resin "A" is less than 20, the hydrophilic properties of the resin reaction product becomes too low because of the decrease in carboxyl groups due to its esterification with resin "B", and the resin "B" cannot be maintained stably in a dispersed state within the aqueous medium. If the acid value exceeds 50, not only can the emulsification force not be expected but the corrosion resistance of the coated film falls, which is not favorable.

The hydroxyl value of resin "A" is important for the solubility of resin "A" in water, adjustment of its compatibility with resin "B" and crosslinking points when using such hardening agents as amino resins or blocked isocyanate compounds. If its hydroxyl value is less than 100, not only can a stable aqueous dispersion not be obtained because of its decrease in water solubility and compatibility with resin "B", but the crosslinking points become too few when using hardening agents. If the hydroxyl value exceeds 300, a bad influence is given to the corrosion resistance and water resistance of the coated film.

When the number average molecular weight of resin "A" is less than 1,000, the protective colloidal emulsion stability of the non-reacted resin "B" becomes low, thereby, it becomes difficult to obtain a translucent aqueous dispersion and such properties as corrosion resistance, water-resisting property and weatherability of the coated film may deteriorate. If the number average molecular weight exceeds 10,000, the viscosity of the resin reaction product becomes conspicuously high and requires a great amount of an organic solvent for facilitating its handling, thereby, non-volatile matters of the aqueous dispersion and the coating material decrease and the fluidity/smoothness of the coated film during heating and drying is unfavorably affected.

The resin "B" in the present invention is an epoxy resin which is solid at normal temperatures, have a fusing point preferably from 50° to 150° C., a molecular weight of from 2,000 to 30,000, preferably from 2,000 to 10,000, and an epoxy equivalent higher than 1,500. At least a part of this resin "B" forms an addition polymerization substance having hydrophilic properties through reaction with resin "A", which disperses into an aqueous medium and emulsifies non-reacted resin "B" as finely dispersed particles into the aqueous medium, so that the coated film has an excellent corrosion resistance.

As resin "B", so long as the aforesaid range can be satisfied, commercially available epoxy resins which are solid at normal temperatures can be used. Such substances as "EPIKOTE 1007", "EPIKOTE 1009", "EPIKOTE 1100L", (trademarks of Shell Chemical Corp.), "ARALDITE 7097", "ARALDITE 6097", "ARALDITE 6099" (trademarks of Ciba-Geigy Co., Ltd.), "EPICLON 7055", "EPICLON 9055" (trademarks of Dainippon Ink and Chemicals Co., Ltd.) and "EPOTOHTO YD 017", "EPOTOHTO YD 019" and "EPOTOHTO YD 020" (trademarks of Tohto Kasei Co., Ltd.) can be used. Further, epoxy compounds and epoxy derivatives which can be easily produced from the above-mentioned resins can be used such as fatty ester epoxy resins, polyol epoxy resins and polyglycol epoxy resins.

Why resin "B" is limited to the aforementioned range is attributable to the following reason. Namely, if resin "B" is not a solid at normal temperatures, particles of the obtained aqueous dispersion tend to aggregate and a stable aqueous dispersion is not obtainable. If the molecular weight of resin "B" is less than 2,000, not only will the resin not become an unswelled stable aqueous dispersion but such properties as corrosion resistance, water resistance and alkalinity resistance of the coated film may deteriorate. The viscosity of the resin reaction product with resin "A" becomes conspicuously high if the molecular weight of resin "B" exceeds 30,000 and thereby requires a large amount of organic solvent, which invites a decrease in non-volatile matters of the aqueous dispersion and product coating material, and deteriorates the fluidity and smoothness of the coated film during heating and drying.

If the epoxy equivalent of resin "B" is less than 1,500, excessive ring-opening esterification of oxirane rings happens during the esterification reaction with resin "A", bringing about a conspicuous increase in viscosity or a gelation and the damaging of the storage stability of the coating material.

The aqueous dispersion type coating material according to the present invention contains, as a film-forming constituent, an aqueous dispersion which is obtained by emulsifying into an aqueous medium, a resin reaction product with acid value from 10 to 30 which is obtained by the addition polymerization of resin "A" and resin "B" at a ratio from 80/20 to 20/80 by weight.

When resin "A" and resin "B" are reacted with each other at the aforesaid ratio, the addition polymerization happens by ring-opening esterification between at least a part of a carboxyl group of resin "A" and an oxirane ring of at least a part of resin "B" or by esterification with a hydroxyl group. The resin reaction product not only is dispersed into an aqueous medium because of its hydrophilic property but also disperses the non-reacted water-insoluble resin "B" in the colloidal emulsion region by dint of its interfacial activity to form a translucent aqueous dispersion. The esterification reaction between resin "A" and resin "B" is preferably conducted at 120° to 160° C. so as to facilitate reaction control, and an amine catalyst may be used in order to promote ring-opening esterification with the oxirane ring. In order to facilitate agitation, an hydrophilic organic solvent possessing no active hydroxyl groups may be used, and, as this type of hydrophilic organic solvent, methyl propylene glycol, propyl propylene glycol, diethylene glycol dimethyl ether, diethylene glycol dimethyl ether, diethylene glycol diethyl ether, triethylene glycol dimethyl ether, etc., may be used.

The end point of the esterification reaction is at the point in time when the acid value of the resin reaction product falls within the aforesaid range and, preferably, when the range of esterification of carboxyl groups in resin "A" is within 10 to 50%. Actually, it is desirous to emulsify the resin reaction product in water in the reaction process and to determine the end point when an aqueous dispersion of translucent colloidal emulsion region is obtained.

Why the ratio between resin "A" and resin "B", as well as the acid value of the resin reaction product is limited to the aforementioned range in the present invention is attributable to the following reason.

Namely, when the proportion of resin "A" is less than 20% of total weight (internal division calculation) of resins "A" and "B", an aqueous dispersion in the translucent colloidal emulsion region cannot be obtained and, for this reason, the smooth finished appearance and storage stability of the product coating material become worse. If the volume of resin "A" exceeds 80%, the corrosion resistance of the product coating material decreases. On the other hand, if the acid value of the resin reaction product is less than 10, the water-solubility of the resin reaction product becomes too low and translucent aqueous dispersions in the colloidal emulsion region cannot be obtained. If the acid value exceeds 30, the corrosion resistance of the coated film falls down.

The concentration of the resin reaction product in the aqueous dispersion coating material may preferably be around 30 to 60 weight % in total weight.

The aqueous dispersion coating material in this invention contains, as a film-forming constituent, an aqueous dispersion obtained by contacting an aqueous medium containing a base, a mixture of the aforesaid resin reaction product and other constituents added as necessary. The aqueous dispersion may preferably be produced by the following method.

First, the resin reaction product is neutralized by a base used in general aqueous coating materials such as ammonia, triethyl amine, dimethyl ethanol amine, diethyl methanol amine, diethanol amine, methyl diethanol amine, 2-amino-2-methyl propanol, etc. The neutralization rate of the carboxyl groups in the resin reaction product by the base may preferably be within the range of 0.2 to 1 equivalent. When the rate is less than 0.2 equivalent, the dispersed particles cannot be emulsified stably, while if the ratio exceeds the level of 1 equivalent, the viscosity of the aqueous dispersion increases and a drop in non-volatile matter of the product coating material is invited.

The resin reaction product which has been neutralized with the base is then brought into contact with an aqueous medium to be dispersed and to be emulsified. Here, an aqueous medium means water or a solution in which an organic solvent or other substances have been mixed with water. As the emulsification method, any of the methods of adding the aqueous medium continuously to the resin reaction product and the method of adding the resin reaction product continuously to the aqueous medium is acceptable. At this time, for the purpose of facilitating its dispersion into the aqueous medium, it is acceptable to heat the resin reaction product and water in advance, and, for the same purpose, organic solvents usually used in aqueous coating materials may be used. The total amount of organic solvents used in this step and in the aforementioned esterification reaction is desirably 10 weight % or below with respect to the weight of resin reaction product for the sake of not damaging its characteristics as an aqueous coating material. The amount of water to contact with the resin reaction product is preferably in the range from 40 to 200 weight % with respect to the weight of resin reaction product. When a water-insoluble hardening agent is to be used for the final coating material, the hardening agent may be mixed previously into the resin reaction product and may be dispersed into the aqueous medium during this emulsification process. For agitation and mixing in the emulsification process, any agitator used for coating materials can be used.

Since the translucent aqueous dispersion obtained through the emulsification contains epoxy groups and carboxyl groups, the dispersion can form a film by baking without a hardening agent. However, it is desirous to add a hardening agent to the dispersion in order to prepare a heat-curing or a forced drying coating material. As the hardening agent, one or more compounds selected from amino resins and blocked isocyanates are useful. As amino resins, such substance as the condensate or co-condensates of formaldehyde and urea, melamine or benzoguanamine are used. Further, etherificated substances of alcohols having 4 or less carbon atoms with these condensates can also be used. As the blocked isocyanates, there may be useful such polyisocyanate compounds having two or more isocyanate groups within a molecule blocked with a blocking agent, such as ethylene diisocyanate, propylene diisocyanate, tetraethylene diisocyanate, hexamethylene diisocyanate, decamethylene diisocyanate, m-phenylene diisocyanate, p-phenylene diisocyanate, 2,4-tolylene diisocyanate, 2,6-tolylene diisocyanate, 1,5-naphthyl diisocyanate, 4,4',4''-triphenylmethane triisocyanate, 4,4'-diphenylmethane diisocyanate, 3,3'-dimethyl-4,4'-diphenyl diisocyanate, m-xylylene diisocyanate, p-xylylene diisocyanate, isohorone diisocyanate, trimethylhexamethylene diisocyanate, etc. As the aforesaid blocking agents, such substances as phenolic compounds like phenol and cresol, alcohols like methanol, benzyl alcohol and ethylene glycol monoethyl ether, active methylene compounds like aceto acetic acid methyl ester and malonic acid dimethyl ester, amides like acetanilide and acetamide, imides, amines, imidazoles, ureas, carbamates, imines, oximes, mercaptans, sulfites, lactams, etc., can be used.

In order to obtain a forced drying coating material, an unsaturated group should previously be combined with resin "A" or resin "B", and a drier based on metal should be compounded as a catalyst.

The aqueous dispersion coating material of the present invention can be produced according to a publicly known method by adding to the aforementioned constituents other necessary constituents, for example, other water-soluble resins, coated surface adjusting agents, etc. Moreover, when a pigmented aqueous dispersion type coating material is to be produced, it can be manufactured by either of the methods, namely, the method of first preparing the pigment paste using a part of resin "A" according to a usual way and then mixing it with an aqueous dispersion of the resin reaction product, or the method of previously kneading the pigment into the resin reaction product and manufacturing an aqueous dispersion of the resin reaction product containing a pigment.

The aqueous dispersion coating material prepared according to the aforesaid method is applied to a coating object in the same manner as conventional aqueous dispersion coating materials to form a film through air drying, baking/hardening and forced drying and the like.

The aqueous dispersion coating material of this invention contains as a film-forming constituent, the resin reaction product of a water-soluble epoxy-denatured alkyd resin having excellent corrosion resistance with a high molecular weight epoxy resin, and hence can form a film having high corrosion resistance. Further, since the resin reaction product can be emulsified into the translucent colloidal emulsion region, the dispersion is stabilized against the addition of organic solvents, and the structural viscosity of the coating material can be controlled, so that the coating material is applicable to a variety of coating methods.

As described above, the aqueous dispersion coating material of this invention can form a film having an excellent finished appearance and corrosion resistance by atomization coating as well as immersion coating, flow coating and the like of vertical areas.

DESCRIPTION OF PREFERRED EMBODIMENTS

Next, examples of the present invention are to be described in which the expressions of "Parts" and "%" stand for the weight parts and weight %, respectively.

Production Example 1: Production of Resin "A1"

13.54 parts of lauric acid, 21.76 parts of adipic acid and 36.11 parts of "EPIKOTE 828" (trademark of Shell Chemical Corp., hereinafter to be referred to in the same name) were charged into a 4-necked flask equipped with an agitator, thermometer, reflux cooler and nitrogen gas inlet, and were heated to 120° C. for 30 minutes. At the point of time when a temperature of 120° C. was reached, 0.05 parts of dimethyl ethanol amine was charged into the mixture and the reaction was continued at 140° C. for 2 hours. Next, 4.51 parts of trimellitic anhydride, 7.95 parts of neopentyl glycol and 6.42 parts of trimethyrol propane were charged into the mixture, heated to 180° C. for 1 hour and esterification was continued at the same temperature for 2 hours, and thus a reaction product with an acid value of 30 was obtained. After cooling to 120° C., the reaction product was diluted with 9.66 parts of methyl propylene glycol, and a water-soluble epoxy-denatured alkyd resin (A1) with an epoxy resin residue content of 40%, lauric acid content of 15%, acid value of 30, hydroxyl value of 180, number average molecular weight of 1,400 and non-volatile matter content of 90% was obtained.

Production Example 2: Production of Resin "A2"

29.99 parts of "HY-DIENE" (trademark of Sohken Chemical Co., Ltd., an unsaturated fatty acid containing 18 carbon atoms, hereinafter to be referred to in this name), 15.98 parts of adipic acid and 39.97 parts of "EPIKOT 828" (already described above) were charged into a flask similar to that in Production Example 1, and heated to 120° C. for 30 minutes. When the temperature reached 120° C., 0.05 part of dimethyl ethanol amine was charged into the mixture and the reaction was continued at 140° C. for 2 hours. In succession, 5.01 parts of trimellitic anhydride, 0.50 parts of neopentyl glycol and 8.50 parts of trimethyrol propane were charged into the mixture, heated to 180° C. for 1 hour and esterification continued at the same temperature for 1.5 hours. Thus, a water-soluble epoxy-denatured alkyd resin (A2) with an epoxy resin content of 40%, C18 fatty acid content of 30%, acid value of 30, hydroxyl value of 140, number average molecular weight content of 1,750 and non-volatile matter content of 100% was obtained.

Production Example 3: Production of Resin "B1"

27.03 parts of xylene, 63.30 parts of "EPIKOTE 1007" (trademark of Shell Chemical Corp.), molecular weight of 2,900, epoxy equivalence of 1,850, fusing point of 128° C., hereinafter to be referred to in the same name), and 9.58 parts of "HY-DIENE" (already described above) were charged into a flask similar to that in Production Example 1, and were heated to 130° C. After ascertaining that the "EPIKOTE 1007" had completely dissolved, 0.09 parts of diethanol amine was charged into the mixture and the reaction was continued at the same temperature for 2 hours. After the end of the reaction, the xylene was removed by vacuum evaporation. Thus a fatty ester epoxy resin (B1) with a solid content of 100%, molecular weight of 3,500, epoxy equivalence not less than 2,000 and a solid at normal temperatures was obtained.

EXAMPLE 1

54.15 parts of a water-soluble epoxy-denatured alkyd resin (A1), 26.24 parts of "EPIKOTE 1007" (already described above) and 8.44 parts of methyl propylene glycol were charged into a flask similar to that in Production Example 1, and were heated up to 130° C. After making sure that the "EPIKOTE 1007" had completely dissolved, 0.04 part of dimethyl ethanol amine was charged into the mixture and esterification was conducted at the same temperature. The emulsification property of the reaction product with water was checked every hour, and 5 hours later, a resin reaction product able to emulsify translucently into water was obtained and the reaction was ended. After cooling to 110° C., the reaction product was added and diluted with 11.13 parts of butyl cellosolve and a resin reaction product with an acid value of 16, solid substance content of 75% and the ratio of resin "A1"/ resin "B" ("EPIKOTE 1007") being at 65/35 was obtained.

Next, in order to produce a translucent aqueous dispersion from the resin reaction product, 53.33 parts of the resin reaction product was heated to 70° C., 0.66 part of dimethyl ethanol amine, corresponding to 0.65 equivalents of carboxyl group in the resin reaction product, was added to the reaction product for uniform neutralization while agitating with a Homo disper (manufactured by Nippon Tokushukika Kogyo Co., Ltd., hereinafter to be referred to in the same name). Then, 46.01 parts of deionized water was gradually added to the mixture while maintaining the same temperature level. After the addition of the deionized water, the mixture was cooled with cold water and a translucent aqueous dispersion with a non-volatile matter content of 40% was obtained.

Next, in order to produce a black aqueous dispersion coating material from the aqueous dispersion, a resin solution of water-soluble epoxy-denatured alkyd resin with a non-volatile matter content of 35% was obtained which consisted of 38.89 parts of a water-soluble epoxy-denatured alkyd resin (A1), 1.25 parts of dimethyl ethanol amine and 59.86 parts of deionized water. Then, a dispersion was made with a sand mill for 1 hour under a compound ratio of 51.87 parts of the resin solution, 36.32 parts of sedimented barium sulfate, 7.27 parts of carbon black and 4.54 parts of deionized water, and a black paste was prepared. 20.63 parts of this black paste, 74.88 parts of the aqueous dispersion, 3.74 parts of a water-soluble melamine resin ("CYMEL #303", trademark of Mitsui Tohatsu Chemical Co., Ltd., hereinafter to be referred to in the same name) as a crosslinking agent, 0.08 part of dimethyl ethanol amine, 0.15 parts of paratoluenesulfonic acid, 0.09 part of an additive for an aqueous coating material ("ADDITOLE XW329", trademark of Hoechst Corporation, hereinafter to be referred to in the same name) and 0.43 part of deionized water were mixed, and a black aqueous dispersion coating material with a non-volatile matter content of 46.5%, a ratio of pigment / resin of 2.4/10 and a ratio of water-soluble epoxy-denatured alkyd resin (A1) / "EPIKOTE 1007" of 70/30 was obtained.

EXAMPLE 2

42.94 parts of a water-soluble epoxy-denatured alkyd resin (A1), 31.62 parts of "EPIKOTE 1009" (trademark of Shell Chemical Corp., molecular weight of 3,750, epoxy equivalent of 2,850, melting point of 148° C., hereinafter to be referred to in the same name) and 8.30 parts of methyl propylene glycol were charged into a flask similar to that in Production Example 1 and heated to 130° C. After confirming that the "EPIKOTE 1009" had completely dissolved, 0.02 parts of dimethyl ethanol amine was charged into the mixture, and esterification was conducted at the same temperature. The emulsification property of the reaction product with water was checked every hour, and in 5 hours, a resin reaction product able to emulsify translucently into water was obtained and the reaction was ended. After cooling the resin reaction product down to 110° C., 17.12 parts of butyl cellosolve was added to the reaction product to dilute it, and a resin reaction product with a resin acid value of 13, a ratio of resin "A1"/ resin "B" of 55/45 and a non-volatile matter content of 70% was obtained.

Next, in order to produce a translucent resin dispersion from this resin reaction product, 57.14 parts of the resin reaction product was heated up to 80° C., 0.54 parts of dimethyl ethanol amine corresponding to 0.65 equivalents of carboxyl group in the resin reaction product was added to the reaction product while agitating with a Homo disper for uniform neutralization. Then 42.32 parts of deionized water was gradually added to it while maintaining the same temperature. After the addition of the deionized water, the mixture was cooled with cold water, and a translucent aqueous dispersion with non-volatile matter at 42% was obtained.

Then, 73.81 parts of the aqueous dispersion, 21.33 parts of black paste prepared in Example 1, 3.87 parts of water-soluble melamine resin (already described above), 0.06 part of dimethyl ethanol amine, 0.16 parts of paratoluenesulfonic acid, 0.10 part of an additive (already described above) for aqueous coating materials and 0.67 parts of deionized water were added to the mixture, and denatured alkyd resin (A1) / "EPIKOTE 1009" of 60/40 was obtained.

EXAMPLE 3

52 parts of water-soluble epoxy-denatured alkyd resin "A2" and 28 parts of solid state fatty ester epoxy resin "B1" were charged into a flask similar to that in Production Example 1, and were heated to 180° C. for esterification. The emulsification property with water was checked every 30 minutes, and 90 minutes later, a resin reaction product capable of emulsifying translucently into water was obtained and thus the reaction was ended. After cooling to 130° C., the resin reaction product was added to and diluted with 20 parts of butyl cellosolve, and a resin reaction product with an acid value of 17, a ratio of resin "A2"/ resin "B1" of 65/35 and a non-volatile matter content of 80% was obtained.

Then, in order to produce a translucent resin dispersion from this resin reaction product, 47.5 parts of the resin reaction product was heated to 60° C., and 0.77 parts of triethyl amine corresponding to 0.75 equivalents of carboxyl group in the resin reaction product was added to the reaction product while agitating with Homo disper for uniform neutralization. Then 51.73 parts of deionized water was gradually added to the mixture while maintaining the same temperature. After the addition of deionized water, the mixture was cooled with cold water and a translucent aqueous dispersion with a non-volatile matter content of 38% was obtained.

Next, in order to produce a black aqueous dispersion coating material from the aqueous dispersion, dispersion was continued with a sand mill for one hour under a compound ratio of 18.24 parts of water-soluble epoxy-denatured alkyd resin "A2", 4.56 parts of butyl cellosolve, 0.98 part of triethyl amine, 32.46 parts of deionized water, 36.10 parts of sedimentated barium sulfate and 7.66 parts of carbon black, and a black paste was prepared. Next, 18.27 parts of this black paste, 78.95 parts of the aqueous dispersion, 0.08 part of triethyl amine, 1.31 parts of 2.5% manganese naphthenate aqueous solution, 1.31 part of 2.5% cobalt naphthenate aqueous solution as driers and 0.08 parts of an additive (already described above) for aqueous coating materials were mixed, and a black aqueous dispersion coating material of forced drying type with non-volatile matter of 41.3%, a ratio of pigment / resin of 2.4/10, and a ratio of water-soluble epoxy-denatured alkyld resin "A2"/ solid state fatty ester epoxy resin of 70/30 was obtained.

COMPARATIVE EXAMPLE 1

An aqueous dispersion type coating material in which resin "A1" and resin "B" ("EPIKOTE 1007") had not been esterified was produced by mixing the water-soluble epoxy-denatured alkyd resin "A1" and "EPIKOTE 1007" used in Example 1.

That is to say, 69.27 parts of an aqueous dispersion with a ratio of resin "A1"/ resin "B" ("EPIKOTE 1007") of 65/35, 50% by weight having an average particle size of 0.3 microns and a non-volatile matter content of 47.5%, 22.34 parts of the black paste prepared in Example 1, 4.11 parts of a water-soluble melamine resin (already stated in the above) 0.17 parts of dimethyl ethanol amine 0.16 parts of paratoluenesulfonic acid, 0.10 parts of an additive (already described above) for aqueous coating materials and 3.85 parts of deionized water were mixed, and a black aqueous dispersion coating material with a non-volatile matter of 51.5%, a ratio of pigment / resin of 2.4/10 and a ratio of water-soluble epoxy-denatured alkyld resin "A1"/ "EPIKOTE 1007" of 70/30 was obtained.

COMPARATIVE EXAMPLE 2

An aqueous dispersion coating material in which resin "A1" and resin "B" ("EPIKOTE 1009") had not been esterified was produced by mixing the water-soluble epoxy-denatured alkyd resin "A1" and "EPIKOTE 1009" used in Example 2.

In other words, 71.33 parts of an aqueous dispersion with a ratio of resin "A1"/ resin "B" ("EPIKOTE 1009") of 55/45, 50% by weight having an average particle size of 0.6 microns and non-volatile matter content of 47.5%, 23.00 parts of black paste prepared in Example 1, 4.23 parts of a water-soluble melamine resin (already describe above), 0.14 parts of dimethyl ethanol amine, 0.16 parts of paratoluene-sulfonic acid, 0.10 parts of an additive (already described above) for aqueous coating materials and 1.04 parts of deionized water were mixed, and a black aqueous dispersion type coating material with a non-volatile matter content of 53%, a ratio of pigment / resin of 2.4/10 and a ratio of water-soluble epoxy-denatured alkyd resin "A1"/ "EPIKOTE 1009" of 60/40 was obtained.

COMPARATIVE EXAMPLE 3

An aqueous dispersion coating material in which resin "A2" and resin "B1" had not been esterified was produced by use of the water-soluble epoxy-denatured alkyld resin "A2" and solid state fatty acid epoxy resin "B1" used in Example 3.

Namely, 74.65 parts of an aqueous dispersion with a ratio of resin "A2"/ resin "B1" of 65/35, 50% by weight having an average particle size of 0.5 microns and a non-volatile matter content of 45%, 22.19 parts of black paste used in Example 3, 0.08 parts of triethyl amine, 1.49 parts of 2.5% manganese naphthenate aqueous solution, 1.49 parts of 2.5% cobalt naphthenate aqueous solution as driers and 0.10 part of an additive (already described above) for aqueous coating materials were mixed and a black aqueous dispersion type coating material of forced drying type with a non-volatile matter content of 46.3%, a ratio of pigment / rein of 2.4/10 and a ratio of water-soluble epoxy-denatured alkyd resin "A2"/ solid state fatty acid epoxy ester rein "B1" of 70/30 was obtained.

EXPERIMENTAL EXAMPLE

Butyl cellosolve was added at 20% of the coating material weight to the black coating material prepared in each Example and diluted with deionized water, while the black coating material prepared in each Comparative Example was diluted with deionized water without adding butyl cellosolve, because the coating material may have had a problem of particle aggregation, to adjust the viscosity (20° C.) of the coating materials to 40 seconds by using Fordcup #4. Next, each coating material was immersion-coated respectively onto a degreased cold-rolled steel plate, then baked in a vertical position at 140° C. for 30 minutes after placing the cold rolled steel plate at 20° C. for 20 minutes in a vertical state. Thus a completed average coated film thickness of 20 microns was obtained. Then the obtained test piece was tested as to finished appearance, physical properties and corrosion resistance of a coated film.

In addition, another cold-rolled steel plate which was bent in an L-letter shape, degreased and immersion-coated with the aforesaid diluted coating material and placed horizontally at 20° C. for 20 minutes, then baked at 140° C. for 30 minutes. Thus a completed average film thickness of 20 microns was obtained. Then the immersion workability was judged in view of the generated problems of liquid puddles and pinholes of the bent portion.

Moreover, the coating material which has been obtained in each Example 1 to 3 and Comparative Example 1 to 3 was diluted to adjust the viscosity to 30 seconds (20° C.) with deionized water by using Fordcup #4 and air-sprayed onto a degreased cold rolled steel plate so that the average dried coated film thickness was 20 microns on the average. After the cold-rolled steel plate was placed vertically at 20° C. for 10 minutes for setting, the vertical setting was continued at 60° C. for 10 minutes, and the plate was baked at 140° C. for 30 minutes. Then the air-spray workability was judged in view of the generated problems of drips and pinholes.

Additionally, the storage stability of each coating material after being stored for one month at room temperature was judged when the organic solvents were added to and when the solvents were not added to the coating materials.

The results are shown in Table 1.

water-insoluble constituent had not been condensed and reacted with the water-soluble resin. Further, the finished appearance and the immersion workability were inferior and the storage stability when organic solvents were added was also inferior because of sedimentation due to particle aggregation.

What is claimed is:

1. An aqueous dispersion coating material comprising, as a film-forming constituent, an aqueous dispersion prepared by a process comprising the steps of:

reacting a first resin having an acid value of 20 to 50, a hydroxyl value of 100 to 300 and a number-average molecular weight of from 1,000 to 10,000, with a second resin comprising an epoxy resin having a molecular weight of 2,000 to 30,000, an epoxy equivalent of 1,500 or more and a solid state at room temperature, said first resin comprising a polymeric water-soluble epoxy-denatured alkyd resin obtained by reacting a polyol, a bisphenol epoxy resin, a polycarboxylic acid and an alkyl group-providing material, said alkyl group-providing material having in its molecular 8 to 30 carbon atoms and being selected from the group consisting

TABLE 1

| Test items | | | Example | | | Comparative Example | | |
|---|---|---|---|---|---|---|---|---|
| | | | 1 | 2 | 3 | 1 | 2 | 3 |
| 60 degree specular gloss | 1) | | 99 | 96 | 95 | 95 | 92 | 90 |
| Finished appearance | 2) | | O | O | O | Δ | Δ | Δ |
| Pencil hardness | 3) | | F | H | H | F | H | H |
| Adhesive property | 4) | | 100/100 | 100/100 | 100/100 | 100/100 | 100/100 | 100/100 |
| Impact resistance | 5) | | 50 | 50 | 50 | 50 | 50 | 50 |
| Moisture resistance | 6) | | O | O | Δ | O | O | Δ |
| Acid resistance | 7) | | O | O | O | O | O | O |
| Alkali resistance | 8) | | O | O | Δ | O | O | Δ |
| Corrosion resistance | 9) | | 2 mm | 1.5 mm | 5 mm | 2 mm | 1.5 mm | 5 mm |
| Immersion workability | 10) | | O | O | O | X | X | X |
| Air-spray workability | 11) | | O | O | O | O | O | O |
| Storage stability after one month at room temperature | 12) | No addition of organic solvents | Favorable | Favorable | Favorable | Favorable | Favorable | Favorable |
| | | Addition of solvents | Favorable | Favorable | Favorable | Sedimented | Sedimented | Sedimented |

(Notes).
1) According to "Article 6.7: 60 degree specular gloss" as set forth in JIS K5400.
2) Observation of appearance of test piece. O: Favorable. Δ: There partially exists a collected liquid in the lower area.
3) To comply with "Article 6.14: Pencil scratching test" of JIS K 5400 and with "Article 8.10: Pencil scratching test method" of JIS D0202. Cut the wooden portion alone of a pencil (Mitsubishi Uni, trademark of Mitsubishi Pencil Co., Ltd.) press and abrade its core at an angle of 45 degrees against the coated steel plate surface, and the pencil hardness just before a scar is made on the coated surface shall be taken as the tested value.
4) To comply with "Article 6.15: Crosscut adhesion test" of JIS K5400 and "Article 8.12: Crosscut adhesion test method" of JIS D0202, 11 parallel lines at 1 mm equal spacing were drawn orthogonally to each other onto a test piece using a sharp and thin blade (NT Cutter, trademark) so as to create 100 individual squares of 1 mm² area, to which a cellophane adhesive tape of 24 mm width was applied and immediately pulled upwardly away, and if no squares were peeled away, the test result would be recorded as 100/100.
5) As per the method in Article 6.13.3B (Impact deformation test) set forth in JIS K5400.
6) The appearance of a coated film was observed after leaving it in a moisture cabinet at a temperature of 50° C. and at a humidity of 98% for 120 hours. O: Excellent. Δ: Good.
7) The appearance of a coated film was observed after it had been kept immersed into a 10 volume % sulfuric acid aqueous solution at 20° C. for 8 hours.
8) The appearance of a coated film was observed after 0.2 ml of 5% NaOH aqueous solution had been dripped onto the test piece and had been left alone at 20° C. for 4 hours. O: Excellent. Δ: Good.
9) To comply with Article 7.8 "Salt water spray test" as set forth in JIS K5400. The swollen width on one side of a portion which was cut after making an X-mark cut on the test piece with a sharp and thin blade (NT Cutter) was measured and then it was placed inside a salt water spray testing unit for 120 hours. However, an area of 1 cm from the starting and ending points of the cut was excluded from the object of criteria.
10) Appearance of a coated film in the lower area of bent portion. O: Good. X: There is collected liquid or a pinhole.
11) Appearance of a coated film in the lower area of test piece. O: Good. X: There is collected liquid or a pinhole.
12) The organic solvents were added at 20% with respect to black coating material.

From the above-mentioned results, Examples 1 to 3 proved to be excellent in the appearance of the film (60-degree specular gloss, finished appearance), physical properties of the coated film (pencil hardness, adhesion property, impact resistance, moisture resistance, acid resistance, alkali resistance), corrosion resistance, immersion workability, air-spray workability and storage stability.

In contrast to this, with respect to Comparative Examples 1 to 3, the viscosity could not be controlled by the addition of organic solvents because the inherently of fatty acids, monohydric alcohols, fatty acid esters and aliphatic epoxy compounds, and which contains 30 to 60 weight % of the bisphenol epoxy resin moiety and 10 to 35 weight % of alkyl groups having 8 to 30 carbon atoms, said first resin being reacted with said second resin in a weight ratio of from 80:20 to 20:80 to cause an esterification of 10 to 50% of the groups in the first resin to form a resin reaction product having an acid value of 10 to 30 and unesterified carboxyl groups;

neutralizing the resin reaction product with a base; and emulsifying the neutralized resin reaction product in an aqueous medium to prepare said aqueous dispersion.

2. The aqueous dispersion coating material described in claim 1, in which the first resin is a water-soluble epoxy-modified alkyd resin obtained by reacting a bisphenol epoxy resin, a polycarboxylic acid and an alkyl group-providing material to obtain a resultant produce and reacting the resultant product with a polyol and a polycarboxylic acid.

3. The aqueous dispersion coating material described in claim 1, which contains a catalyst which is an amine.

4. The aqueous dispersion coating material described in claim 1, wherein said first resin has an epoxy resin content of 40%, an acid value of 30, a lauric acid content of 15%, a hydroxy value of 180, a number-average molecular weight of 1,400 and a nonvolatile matter content of 90%.

5. The aqueous dispersion coating material described in claim 1, wherein said first resin has an epoxy resin content of 40%, a fatty acid having 18 carbon atoms content of 30%, an acid value of 30, a hydroxyl value of 140, a number-average molecular weight of 1,750 and a nonvolatile matter content of 100%.

6. The aqueous dispersion coating material described in claim 1, wherein said second resin has a solid content of 100%, a molecular weight of 3,500 and an epoxy equivalence of not less than 2,000.

7. The aqueous dispersion coating material described in claim 1, wherein said first resin has an acid value of 25 to 40, a hydroxyl value of 100 to 200, a number-average molecular weight of 1,000 to 5,000, contains 30 to 50 weight % of the bisphenol epoxy resin in the polymer main chain and has 10 to 30 weight percent of alkyl groups having 10 to 20 carbon atoms in a side chain.

8. The aqueous dispersion coating material described in claim 1, in which the alkyl group-providing material with 8 to 30 carbon atoms is one or more compounds selected from the group consisting of monovalent alcohols, fatty acid esters and aliphatic epoxy compounds.

9. An aqueous dispersion coating material described in claim 1, in which the resin reaction product is a substance which can be dispersed into an aqueous medium and form a translucent colloidal emulsion.

10. An aqueous dispersion coating material described in claim 8, in which the resin reaction product is a substance which can be dispersed into an aqueous medium and form a translucent colloidal emulsion.

* * * * *

UNITED STATES PATENT AND TRADEMARK OFFICE
CERTIFICATE OF CORRECTION

PATENT NO. : 5 202 364
DATED : April 13, 1993
INVENTOR(S) : Hitoshi TANIGUCHI et al It is certified that error appears in the above-identified patent and that said Letters Patent is hereby corrected as shown below:

Column 14, line 66; after "the" (first occurrence) insert ---carboxyl---.

Column 15, line 15; change "which contains a catalyst which is an amine" to ---in which the catalyst is an amine---.

Signed and Sealed this

Fifteenth Day of February, 1994

Attest:

BRUCE LEHMAN

Attesting Officer    Commissioner of Patents and Trademarks